(12) United States Patent
Chen

(10) Patent No.: US 6,920,499 B2
(45) Date of Patent: Jul. 19, 2005

(54) RESOURCE RESERVATION IN THIRD GENERATION TELECOMMUNICATION NETWORK BY COMPARING RSVP MESSAGES

(75) Inventor: Xiaobao X Chen, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 770 days.

(21) Appl. No.: 09/848,021

(22) Filed: May 3, 2001

(65) Prior Publication Data

US 2001/0054103 A1 Dec. 20, 2001

(30) Foreign Application Priority Data

May 9, 2000 (EP) ............................................ 00303897

(51) Int. Cl.[7] .............................................. G06F 13/00
(52) U.S. Cl. ....................................................... 709/227
(58) Field of Search ................................ 709/200, 223, 709/226, 227, 228, 229; 370/235, 410

(56) References Cited

FOREIGN PATENT DOCUMENTS

WO  WO 00/10357  2/2000
WO  WO 00/41401  7/2000

OTHER PUBLICATIONS

Lucent Technologies, "Supporting RSVP applications in UMTS network" (TSGS2#12 S2–000368), TSGA–SA Working Group 2 meeting #12, Tokyo, Japan, (Mar. 6–9, 2000).*
Nokia, "RSVP Applicability Study for 3G Networks" (S2–000400), 3GPP TSG SA WG 2 Meeting #12, Tokyo, Japan, pp. 1–4, (Mar. 6–9, 2000).*
SRP: A Scalable Resource Reservation Protocol For The Internet, Almesberger et al. Computer Communications 21 (1998) 1200–1211.
RSVP: A New Resource ReSerVation Protocol, L. Zhang et al. IEEE Network Sep. 1993, XP 002145982 pp. 8–18.
European Search Report dated Mar. 1, 2001.

* cited by examiner

Primary Examiner—Robert B. Harrell

(57) ABSTRACT

In the UMTS, resource reservation is provided by using unidirectional RSVP messages to set up a bi-directional PDP context. The MT 30 and a support node 24 can be arranged to compare incoming RSVP messages with any existing secondary PDP context, and if a match is found, no action is taken on the incoming message. The match is made by determining whether a flag is set. This eliminates "racing" when each end of an RSVP session sends an RSVP message.

2 Claims, 5 Drawing Sheets

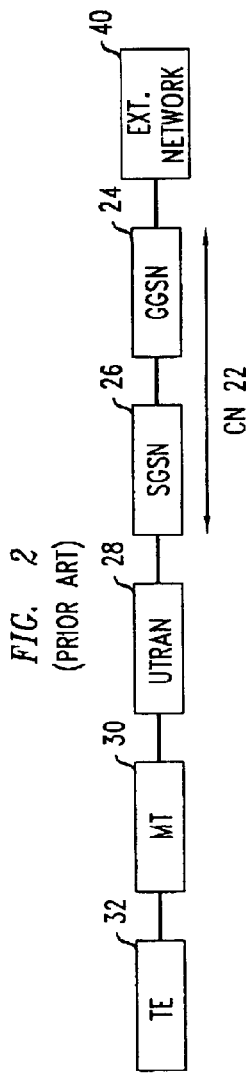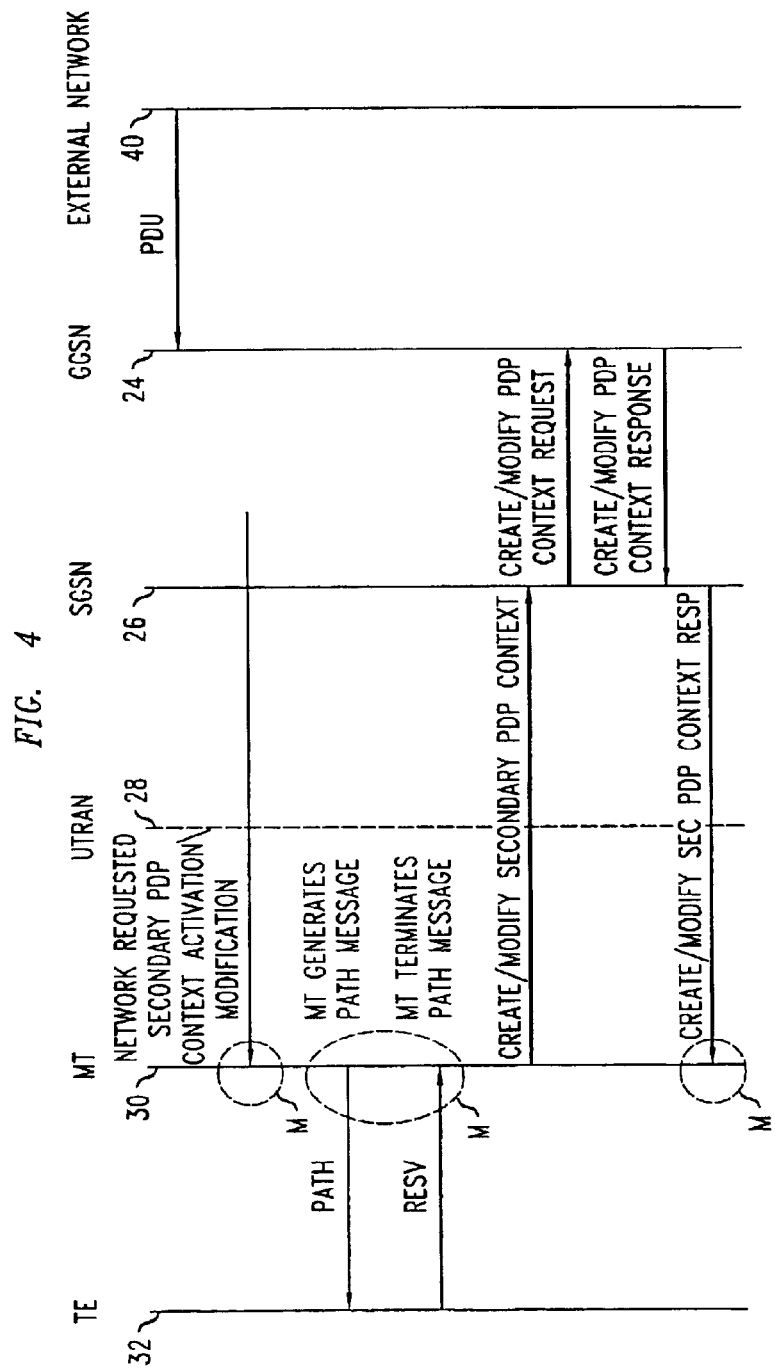

RESOURCE RESERVATION IN THIRD GENERATION TELECOMMUNICATION NETWORK BY COMPARING RSVP MESSAGES

CROSS-REFERENCE TO RELATED APPLICATION

This application claims priority of European Patent Application No. 00303897.3, which was filed on May 9, 2000.

BACKGROUND OF THE INVENTION

1. Field of the Invention

This invention relates to telecommunications networks operating the Internet Protocol (IP), and relates especially to a method of reserving resources.

2. Description of Related Art

In third generation (3G) telecommunications networks, such as Universal Mobile Telecommunication System (UMTS), broad bandwidth is provided for services such as data and multimedia in addition to voice. An obvious need is that required Quality of Service (QoS) should be provided to users, but in IP networks, if contention for resources is not resolved, then QoS cannot be guaranteed.

In IP networks or the Internet in general, Resource reSerVation Protocol (RSVP) is used to allow the network to reserve resources so as to provide QoS. RSVP can be used for QoS control locally or it may be used across IP networks.

RSVP is an end-to-end protocol and is illustrated in FIG. 1. A transmitting user 10 sends to a receiving user 12 a message PATH. The PATH message carries the traffic characteristics information such as Tspecs to indicate the traffic behavior that is to be sent from the user 10. When the receiving user receives the PATH message, it sends a RESV message which contains QoS requests such as FlowSpecs. In practice, the transmitting and receiving users 10, 12 can be located remotely so that PATH and RESV messages pass through several nodes in UMTS. As each node receives either of the messages, it makes a decision as to whether adequate resources in that node can be reserved. If this is possible, then the messages are relayed to the next hop for the PATH message and to the previous hop for the RESV message. When the RESV message reaches the transmitting user 10, it begins to transmit data.

Periodic refresh messages are sent subsequently to maintain the QoS status at each node in which it has been set up.

At the TSG-SA Working Group 2 meeting No. 12 in Tokyo, 6–9, Mar. 2000 a disclosure was made by applicant of arrangements in which a mobile system using RSVP can communicate across a GPRS/UMTS network with another RSVP user; a proxy activated by the mobile receives and processes PATH messages and generates RESV messages in return.

Applicant's co-pending European published patent application no. EP-A-1154664 filed on even date describes an inventive method in which RSVP messages are filtered at a mobile and at a Serving GPRS Support Node (SGSN) or a Gateway GPRS Support Node (GGSN), and the mobile and the support node are arranged to activate Packet Data Protocol (PDP) Context Activation Procedure. However, conflicts can arise in certain circumstances.

SUMMARY OF THE INVENTION

It is an object of the invention to provide a method of reserving resources in third generations wireless mobile networks such as UMTS which has no or minimal impact on existing architecture or QoS procedures, that overcomes the aforementioned conflict.

According to the invention, in a third generation telecommunication network, a method of allocating resources for user traffic passing between a mobile terminal and a remote user, characterized in that unidirectional Resource reSerVation Protocol (RSVP) messages are compared so as to detect any previous RSVP message for that session.

Preferably a flag is arranged to indicate that an RSVP message for that session has already been sent.

BRIEF DESCRIPTION OF THE DRAWINGS

In the accompanying drawings,

FIG. 1 illustrates the operation of RSVP. The invention will be described by way of example only, with reference to FIGS. 2–5 in which:

FIG. 2 illustrates schematically the UMTS QoS architecture for the control plane;

FIG. 4 illustrates the interchange of messages in a downlink;

DETAILED DESCRIPTION

In FIG. 2 the UMTS 20 comprises a Core Network (CN) 22 formed by a Gateway GPRS Support Node (GGSN) 24 and a Serving GPRS Support Node (SGSN) 26; there is also a UMTS Terrestrial Radio Access Network (UTRAN) 28. A MT 30 communicates with the UTRAN 28 across a radio interface. The MT 30 is connected to Terminal Equipment (TE) 32 which may run non-UMTS specific applications. The MT 30 is UMTS specific, and is capable of processing the traffic from the TE 32 to channel it appropriately to the UMTS, usually to the radio access network.

The GGSN 24 communicates with an External Network 40.

The UMTS 20 operates the application-specific Packet Data Protocol (PDP) context as usual to negotiate the QoS and activate the QoS control between the MT 30 and UMTS network 20.

Figure 1:
Figure 3:
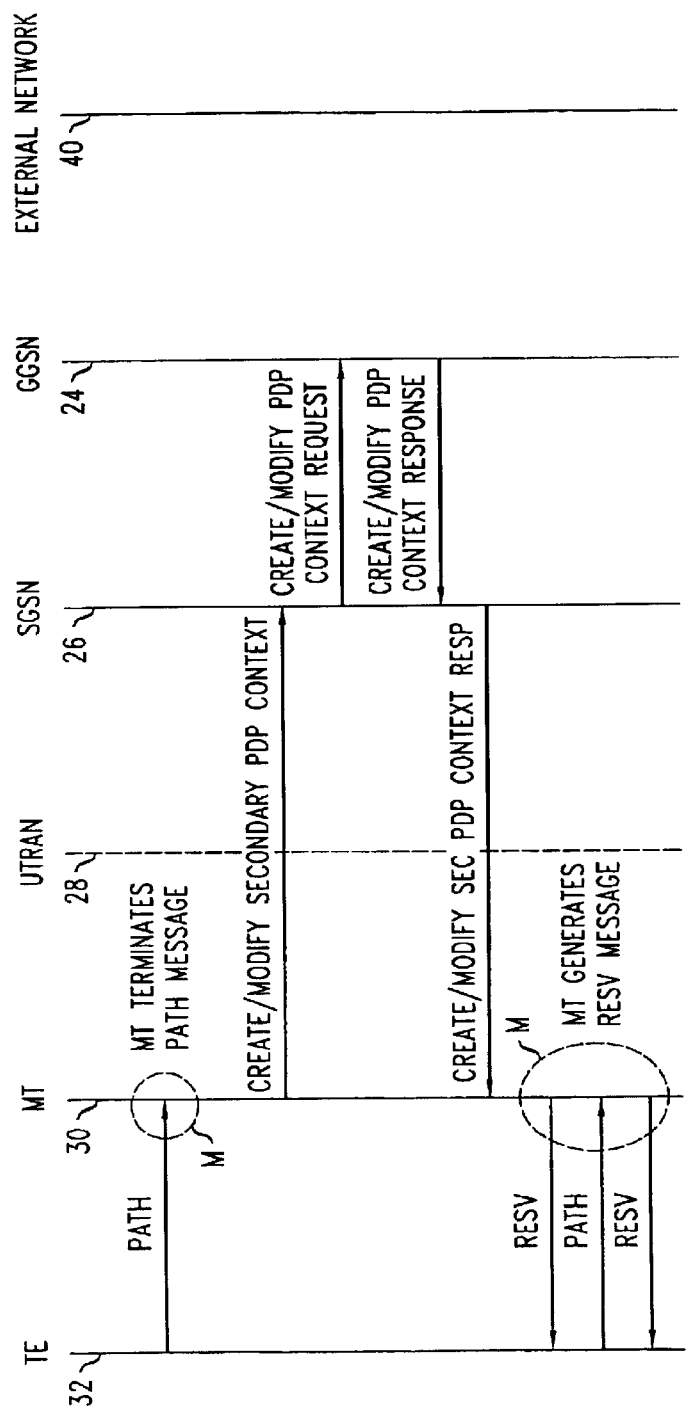
FIG. 3 illustrates the interchange of messages in an uplink.

FIG. 3 illustrates traffic QoS in the uplink direction. RSVP messages are terminated only at the MT 30. The RSVP processing entity in the MT 30 is triggered by a PATH message from TE 32. In response, the MT 30 filters the message, analyses the RSVP parameters carried in the PATH message, and takes a decision whether to modify an existing secondary PDP context or to create a new secondary PDP context, to provide an updated QoS status. The secondary PDP context is then create/modified using the existing PDP Context Control procedures. If the PATH message is a first-time PATH message, a new secondary PDP context is created. If the PATH message is a refresh message with no modified QoS parameter, then no action is taken. The activate secondary PDP context message is sent by the MT 30 across the UTRAN 28 to the SGSN 26, which generates a create/modify PDP context Request message and passes it to the GGSN 24. Return messages from the GGSN are processed similarly by the SGSN, and the MT 30 filters the message and passes a RESV message to the TE 32. The TE 32 may send a refresh PATH message and receive a refresh RESV message.

An important feature of RSVP is its uni-directional QoS request delivery. Specifically, the QoS status in the uplink direction set up by using RSVP does not apply to the QoS status in the downlink direction. This means that a QoS status that applies in both uplink and downlink requires two separate RSVP session set-up processes so as to be in line with the two way QoS status as contained by the PDP context of UMTS. This increases the QoS session set-up time and further complicates the QoS control and management in separate directions, because each direction needs to be controlled and maintained separately.

However, there is a problem which may be termed a "racing" problem because an RSVP terminal may not be UMTS aware, i.e. it may not be aware of a two-way nature of UMTS secondary PDP context. Then each end of an RSVP session may send RSVP messages independently from its remote peer. This means that the GGSN 24 will receive two PATH/RESV messages, each of which applies for each direction (one for uplink and the other for downlink). The same "racing" problem occurs when the RSVP messages are terminated only at the MT 30.

This racing problem has not previously been recognized. In the present invention the problem is resolved by checking if there is any existing secondary PDP context associated with RSVP QoS status by matching the end point information contained in the PDP context in comparison with the incoming RSVP messages. If no match is found, then no action will be taken upon receiving an RSVP message which will then be transparently delivered to the remote peer end as before.

In FIG. 3 the points at which such message comparison takes place, in the MT 30, are indicated at M.

In FIG. 4, which illustrates a downlink, RSVP is terminated only at the MT 30. The session is initiated from the External Network 40 and message processing is similar to that in FIG. 3. The message comparison points, which may be in the MT 30 or the GGSN 24, are also indicated at M.

Figure 5:
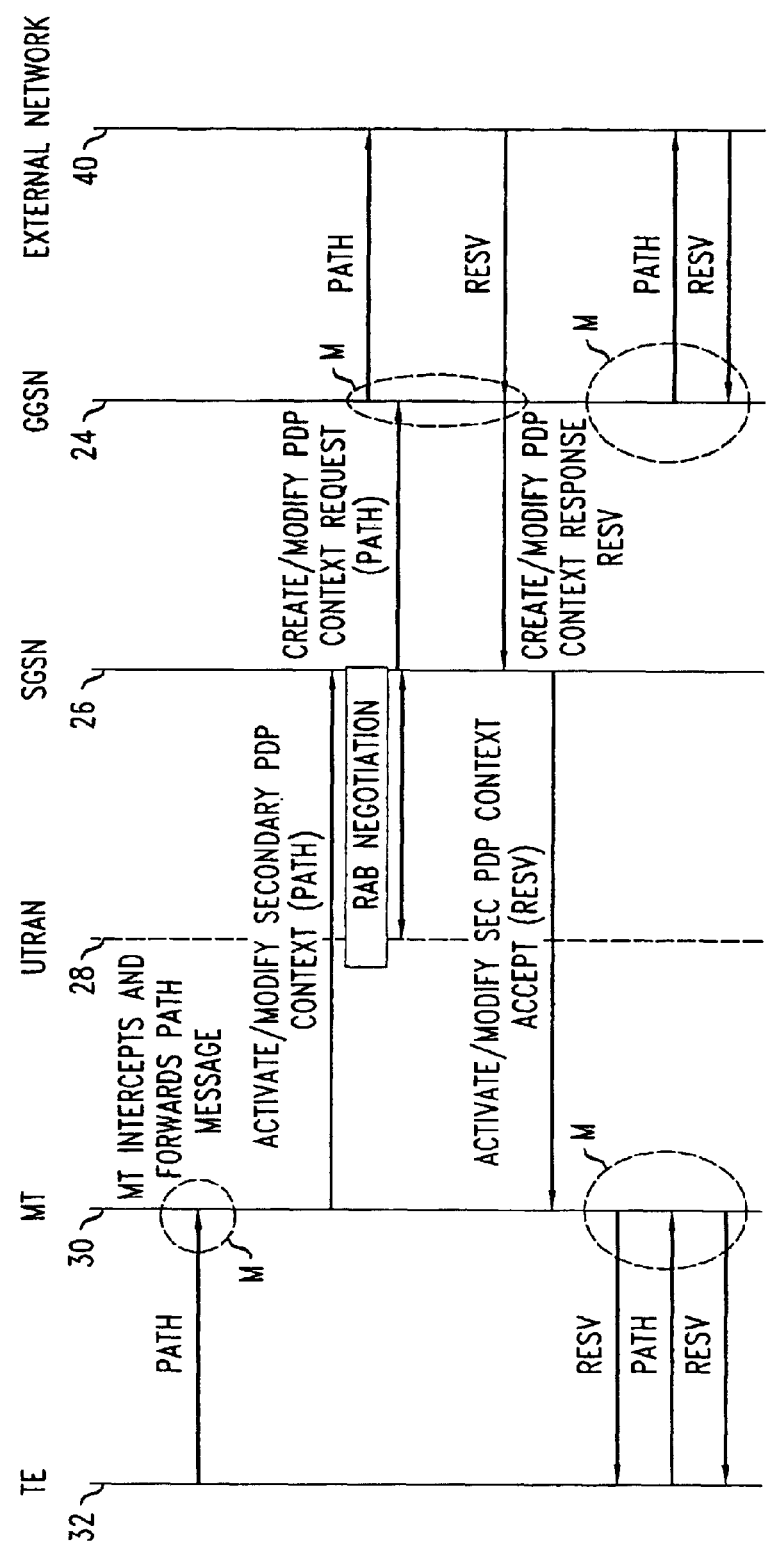
FIG. 5 illustrates the uplink interchange of messages in an end-to-end session.

FIG. 5 illustrates a variation in which a RSVP session is used end-to-end and is terminated at the MT 30 and the GGSN 24. The assumption is that TE 32 intends to set up an RSVP session with its remote peer, which also uses RSVP signaling, in the External Network 40. The Figure shows RSVP activated QoS in the uplink direction. When the MT 30 received a PATH message from TE 32, it checks to see if a PDP context exists for this RSVP session. If it does, the MT 30 triggers the Modify PDP context message if there is a change in QoS parameters.

When the PATH message is received at the GGSN 24, it uses this information, again along with relevant local configuration, to see if QoS Negotiated is the same as QoS Requested. The PATH message is then sent to the external network. Radio Access Barrier (RAB) negotiation can take place between the SGSN 24 and the UTRAN 28 if QoS Negotiated is different from QoS Requested. Finally, the RESV message returned from the external network is filtered by the GGSN, which creates or modifies a PDP Context request message, which is sent to the MT30.

The message comparison points in the MT30 and the SGSN24 are again indicated at M.

Figure 6:
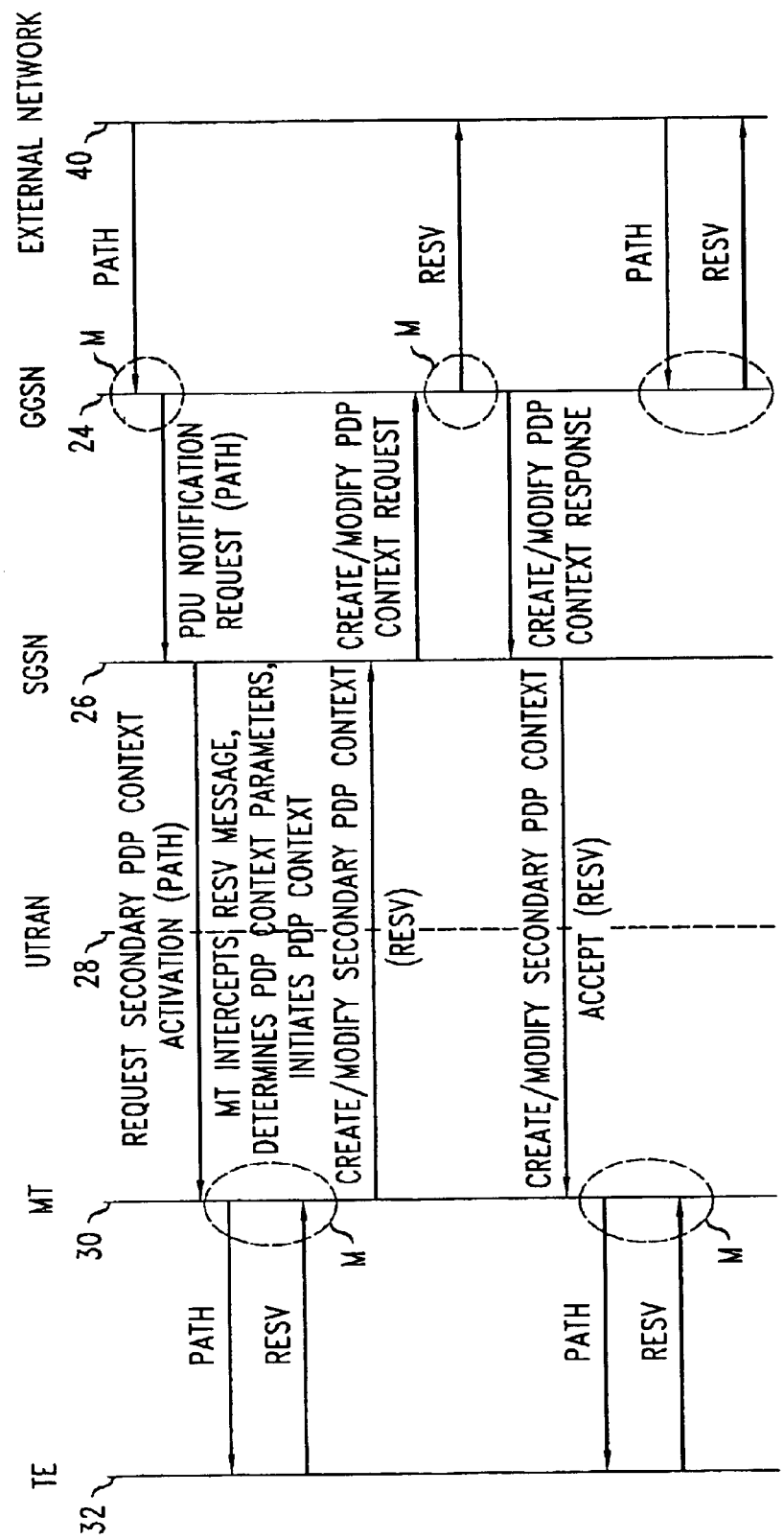
FIG. 6 illustrates the interchange of messages in a downlink direction.
Figure 7:
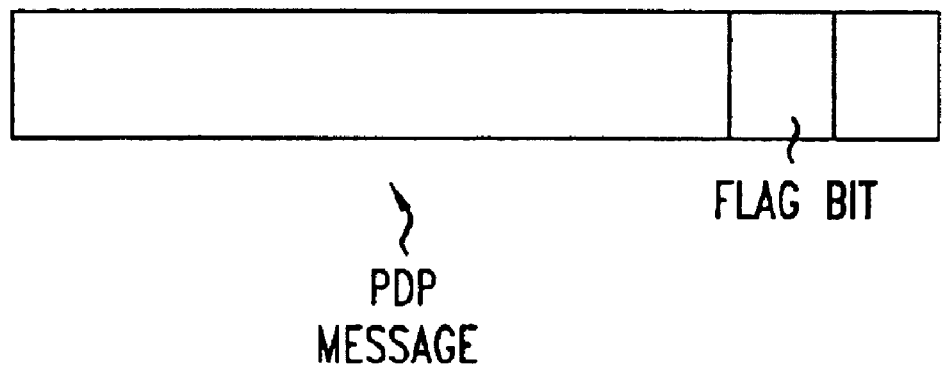
FIG. 7 illustrates an RSVP message.

FIG. 6 shows the end-to-end situation for the QoS control in the downlink direction with filtering in the MT and GGSN.

As before, the message comparison points to prevent the racing problem are indicated at M.

To overcome the racing problem, the comparisons at the point M can be made, for example, in two ways, both involving use of a flag.

In a first arrangement, a flag is made available in every PATH and RESV message by addition of a flag bit.

For an MT-only terminated arrangement, for every session, the flag is set by the MT 30 the first time a RSVP message is sent or received by the MT 30. The flag is sent to the receiving end in the RSVP message for this session, and the receiving end recognizes that it does not need to send a return RSVP message for this session. The message in which the flag is set may be either a PATH message or a RESV message.

If the flag has not been set, then no RSVP message has been sent and there can be no racing problem.

For an MT and support node terminated arrangement, either the MT or the SGSN/GGSN can set the flag. In this arrangement, the MT 30, the GGSN 24 and the SSGN 26 need a small modification so that it/they can set the flag bit and recognize when the bit has been set in a received message, and to act (or not act) appropriately.

In a second arrangement, a session flag is made available in PDP Context, which carries all the information about a session. The session flag can be set by either the MT 30 or the GGSN 24 or the SGSN 26.

For example, when the GGSN 24 receives a first RSVP message (whether it is a Path or a RESV message) it sets the session flag in PDP context; the RSVP message is sent by the GGSN in a first direction to the remote end; it is to be understood that the remote end does not receive a flag. When a return RSVP message in the opposite direction is received by the GGSN 24, it checks if the flag is set for that session; if the flag is set, the GGSN discards any further RSVP messages for that session, therefore the racing problem is avoided.

The GGSN also checks to see if the QoS requirement is the same as in the PDP Context sent out; if the QoS requirement is higher, the GGSN actions the Modify Existing PDP context protocol.

Usually a customer will have the option of deciding whether to change the QoS if it is lower than the present QoS requirement.

In the first arrangement according to the invention with a flag in the RSVP message, the MT 30 prevents the racing problem and the remote end does not pass on the RSVP message. The first arrangement can be applied to messages as shown in FIGS. 3 and 4 in which RSVP messages are filtered in the MT 30 only.

In the second arrangement according to the invention with the flag in the PDP context, the GGSN prevents the racing problem and the remote end does not pass on the RSVP message. The second type of flag is applicable to messages as shown in FIGS. 5 and 6 in which the RSVP messages are filtered at the MT 30 and the GGSN 24.

By such comparisons at any of the indicated positions, the aforesaid "racing" problem is overcome.

Either a RSVP message can be intercepted in the MT and the SGSN or GGSN 26, the MT or support node then initiating PDP context activation procedure, as described in applicant's copending European published patent application no. EP-A-1154664 filed on even date, or the RSVP messages can be "piggybacked" in an IP packet, as set out in applicant's application no. 00301782.9 filed on 3 Mar. 2000.

What is claimed is:

1. A method of allocating resources for user traffic passing between a mobile terminal and a remote user during a call session in a third generation telecommunication network, the method comprising at a support node or mobile terminal:

receiving a first Resource reSerVation Protocol (RSVP) message for the call session, said RSVP message being unidirectional;

responding by both setting a flag in Packet Data Protocol (PDP) Context data for the call session, the flag indicating the first RSVP message was received, and sending on said first RSVP message in a first direction;

receiving back an RSVP reply message in the opposite direction to the first direction, said RSVP reply message being a second or subsequent RSVP message for the call session; and discarding said RSVP reply message as said flag has been set in the PDP Context data.

2. A method according to claim 1, wherein the method is undertaken by the support node, the support node also sending the PDP Context data in one direction and receiving the PDP Context data back in another direction, the support node sensing the flag in the received PDP Context data and so undertaking said discarding of said RSVP reply message.

* * * * *